United States Patent
Jung et al.

(10) Patent No.: US 10,939,438 B2
(45) Date of Patent: **\*Mar. 2, 2021**

(54) METHOD AND APPARATUS FOR TRANSMITTING INDICATION FOR D2D OPERATION IN WIRELESS COMMUNICATION SYSTEM

(71) Applicant: LG ELECTRONICS INC., Seoul (KR)

(72) Inventors: Sunghoon Jung, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 7 days.

This patent is subject to a terminal disclaimer.

(21) Appl. No.: 16/527,498

(22) Filed: Jul. 31, 2019

(65) Prior Publication Data

US 2019/0357216 A1    Nov. 21, 2019

Related U.S. Application Data

(63) Continuation of application No. 15/025,090, filed as application No. PCT/KR2014/009342 on Oct. 2, 2014, now Pat. No. 10,412,735.

(Continued)

(51) Int. Cl.
*H04W 72/00* (2009.01)
*H04W 72/04* (2009.01)
(Continued)

(52) U.S. Cl.
CPC ....... *H04W 72/0453* (2013.01); *H04W 8/005* (2013.01); *H04W 48/16* (2013.01); *H04W 76/10* (2018.02); *H04W 76/14* (2018.02)

(58) Field of Classification Search
CPC ...... H04W 88/08; H04W 76/00; H04W 72/02
See application file for complete search history.

(56) References Cited

U.S. PATENT DOCUMENTS 9,584,988 B2    2/2017    Schmidt et al.
2007/0104138 A1    5/2007    Rudolf et al.
(Continued)

FOREIGN PATENT DOCUMENTS

CN    102640553 A    8/2012
CN    102893657 A    1/2013
(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC): Protocol specification (Release 11)," 3GPP TS 36.331, V11.5.0, Sep. 16, 2013, pp. 1-347, XP050712276.

*Primary Examiner* — Hassan A Phillips
*Assistant Examiner* — Prenell P Jones
(74) *Attorney, Agent, or Firm* — Birch, Stewart, Kolasch & Birch, LLP

(57) ABSTRACT

A method performed by a wireless device in a wireless communication system is discussed. The method includes receiving, by the wireless device, broadcast signaling from a network, wherein the broadcast signaling informs that the network supports a device-to-device (D2D) related information; after receiving the broadcast signaling, transmitting, by the wireless device, a message including the D2D related information based on a change of the D2D related information to the network; receiving, by the wireless device, D2D radio resources from the network via a dedicated signaling; and performing, by the wireless device, a D2D operation based on the D2D radio resources.

10 Claims, 13 Drawing Sheets

Related U.S. Application Data

(60) Provisional application No. 61/886,513, filed on Oct. 3, 2013, provisional application No. 61/898,463, filed on Oct. 31, 2013, provisional application No. 61/934,835, filed on Feb. 2, 2014.

(51) Int. Cl.
*H04W 48/16* (2009.01)
*H04W 8/00* (2009.01)
*H04W 76/14* (2018.01)
*H04W 76/10* (2018.01)

(56) References Cited

U.S. PATENT DOCUMENTS

| | | | |
|---|---|---|---|
| 2011/0106952 A1 | 5/2011 | Doppler et al. | |
| 2011/0258327 A1 | 10/2011 | Phan et al. | |
| 2011/0282989 A1 | 11/2011 | Geirhofer et al. | |
| 2011/0306349 A1* | 12/2011 | Hakola | H04W 28/04 455/450 |
| 2012/0093098 A1* | 4/2012 | Charbit | H04W 72/04 370/329 |
| 2012/0163278 A1 | 6/2012 | Chang et al. | |
| 2012/0213183 A1 | 8/2012 | Chen et al. | |
| 2013/0064138 A1 | 3/2013 | Hakola et al. | |
| 2013/0108000 A1 | 5/2013 | Park et al. | |
| 2013/0114526 A1 | 5/2013 | Ahn et al. | |
| 2013/0223398 A1 | 8/2013 | Li et al. | |
| 2013/0230032 A1 | 9/2013 | Lu et al. | |
| 2014/0206322 A1 | 7/2014 | Dimou et al. | |
| 2014/0241262 A1 | 8/2014 | Novak et al. | |
| 2015/0208225 A1 | 7/2015 | Yu et al. | |
| 2015/0351076 A1 | 12/2015 | Pais et al. | |

FOREIGN PATENT DOCUMENTS

| | | |
|---|---|---|
| JP | 2008-510343 A | 4/2008 |
| JP | 2009-500969 A | 1/2009 |
| JP | 2009-515477 A | 4/2009 |
| JP | 2013-523018 A | 6/2013 |
| JP | 2016-536943 A | 11/2016 |
| WO | WO 2006/016330 A1 | 2/2006 |
| WO | WO 2007/008857 A2 | 1/2007 |
| WO | WO 2011-116017 A1 | 9/2011 |
| WO | WO 2012/128505 A2 | 9/2012 |
| WO | WO 2013/055271 A1 | 4/2013 |
| WO | WO 2015/050405 A1 | 4/2015 |

* cited by examiner (a)

(b)

METHOD AND APPARATUS FOR TRANSMITTING INDICATION FOR D2D OPERATION IN WIRELESS COMMUNICATION SYSTEM

CROSS-REFERENCE TO RELATED APPLICATIONS

This application is a Continuation of co-pending U.S. patent application Ser. No. 15/025,090 filed on Mar. 25, 2016, which is the National Phase of PCT International Application No. PCT/KR2014/009342 filed on Oct. 2, 2014, which claims the priority benefit under 35 U.S.C. § 119(e) to U.S. Provisional Application Nos. 61/934,835 filed on Feb. 2, 2014, 61/898,463 filed on Oct. 31, 2013 and 61/886,513 filed on Oct. 3, 2013, all of these applications are hereby expressly incorporated by reference into the present application.

BACKGROUND OF THE INVENTION

Field of the Invention

The present invention relates to wireless communications, and more specifically, to a method and apparatus for transmitting an indication for a device-to-device (D2D) operation in a wireless communication system.

Discussion of the Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, there has been a surge of interest in supporting direct device-to-device (D2D) communication. This new interest is motivated by several factors, including the popularity of proximity-based services, driven largely by social networking applications, and the crushing data demands on cellular spectrum, much of which is localized traffic, and the under-utilization of uplink frequency bands. 3GPP is targeting the availability of D2D communication in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

From a technical perspective, exploiting the nature proximity of communicating devices may provide multiple performance benefits. First, D2D user equipments (UEs) may enjoy high data rate and low end-to-end delay due to the short-range direct communication. Second, it is more resource-efficient for proximate UEs to communicate directly with each other, versus routing through an evolved NodeB (eNB) and possibly the core network. In particular, compared to normal downlink/uplink cellular communication, direct communication saves energy and improves radio resource utilization. Third, switching from an infrastructure path to a direct path offloads cellular traffic, alleviating congestion, and thus benefiting other non-D2D UEs as well. Other benefits may be envisioned such as range extension via UE-to-UE relaying.

The UE may transmit to the network various information for a D2D operation. Specifically, a frequency indication for a D2D operation may need to be transmitted.

SUMMARY OF THE INVENTION

The present invention provides a method and apparatus for transmitting an indication for a device-to-device (D2D) operation in a wireless communication system. The present invention provides a method for transmitting an indication indicating a list of frequencies preferred for a D2D operation.

In an aspect, a method for transmitting, by a user equipment (UE), an indication for a device-to-device (D2D) operation in a wireless communication system is provided. The method includes transmitting an indication indicating a list of frequencies preferred for a D2D operation. The D2D operation may include reception/transmission of a D2D discovery signal/D2D communication data.

In another aspect, a user equipment (UE) in a wireless communication system is provided. The UE includes a radio frequency (RF) unit for transmitting or receiving a radio signal, and a processor coupled to the RF unit, and configured to transmit an indication indicating a list of frequencies preferred for a device-to-device (D2D) operation.

A frequency indication for a D2D operation can be informed to a network.

DETAILED DESCRIPTION OF THE EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
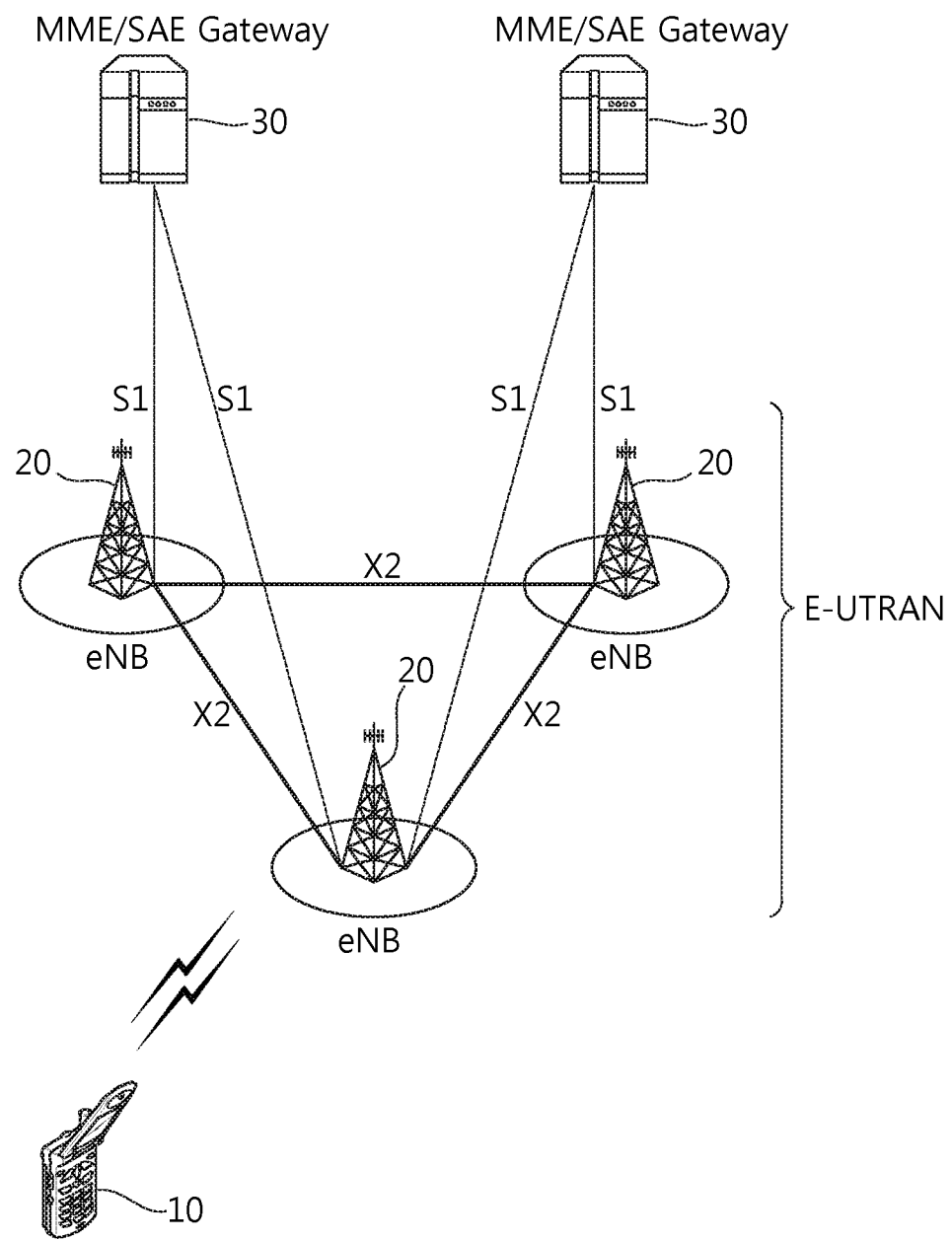
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

Figure 2:
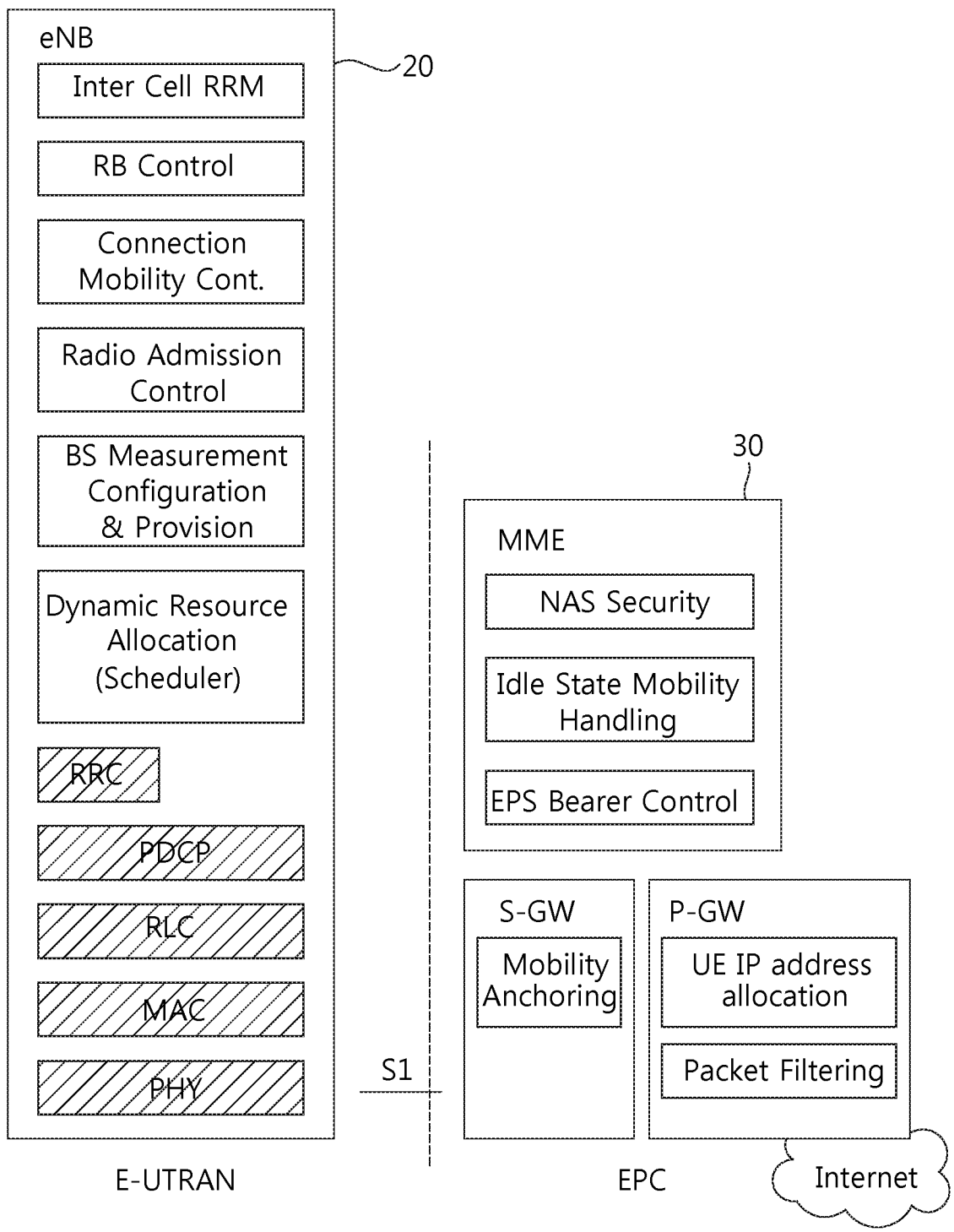
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE ACTIVE state. In the EPC, and as noted above, gateway 30 may perform functions of paging origination, LTE IDLE state management, ciphering of the user plane, SAE bearer control, and ciphering and integrity protection of NAS signaling.

Figure 3:
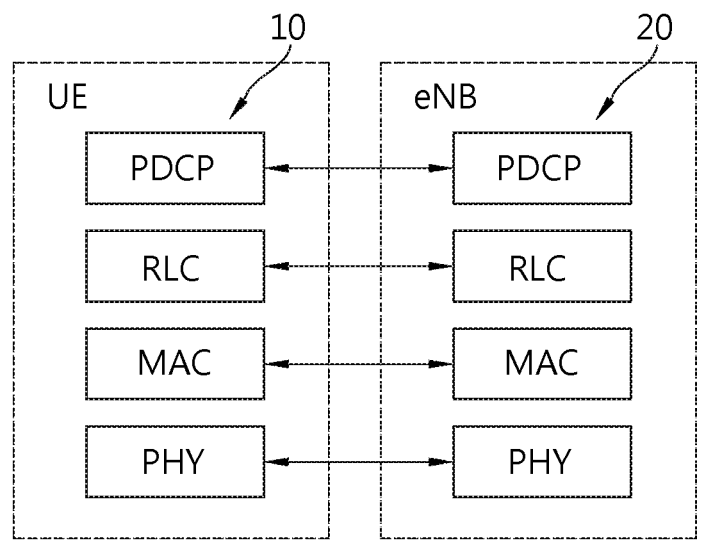
FIG. 3 shows a block diagram of a user plane protocol stack and a control plane protocol stack of an LTE system.
Figure 3:
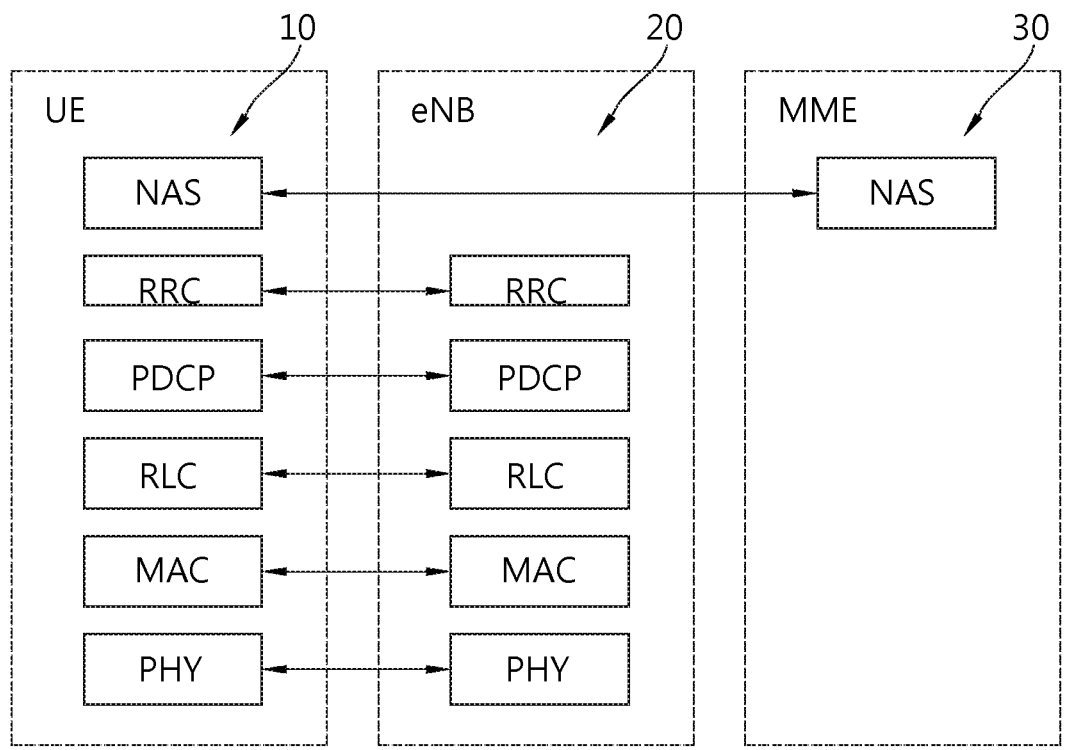

FIG. 3 shows a block diagram of a user plane protocol stack and a control plane protocol stack of an LTE system. FIG. 3-(a) shows a block diagram of a user plane protocol stack of an LTE system, and FIG. 3-(b) shows a block diagram of a control plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
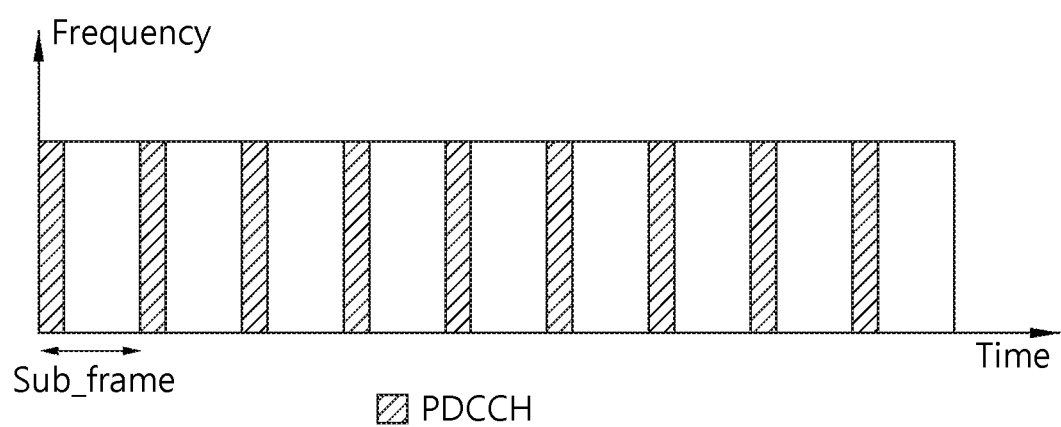
FIG. 4 shows an example of a physical channel structure.

FIG. 4 shows an example of a physical channel structure. A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 3-(a), the RLC and MAC layers (terminated in the eNB on the network side) may perform functions such as scheduling, automatic repeat request (ARQ), and hybrid automatic repeat request (HARQ). The PDCP layer (terminated in the eNB on the network side) may perform the user plane functions such as header compression, integrity protection, and ciphering.

Referring to FIG. 3-(b), the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE IDLE mobility handling, paging origination in LTE IDLE, and security control for the signaling between the gateway and UE.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped o the signature sequence used to transmit messages between a UE and eNB and that either channel quality indicator (CQI)

or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

Transmit power=TransmitPilot−RxPilot+ULInterference+Offset+SNRRequired

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value in the UL in the signature.

Proximity Services (ProSe) are described. It may be refer to 3GPP TR 23.703 V0.4.1 (2013 June). The ProSe may be a concept including a device-to-device (D2D) communication. Hereinafter, the ProSe may be used by being mixed with a device-to-device (D2D).

ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 E-UTRA technology. EPC-level ProSe discovery means a process by which the EPC determines the proximity of two ProSe-enabled UEs and informs them of their proximity.

When the registered public land mobile network (PLMN), ProSe direct communication path and coverage status (in coverage or out of coverage) are considered, there are a number of different possible scenarios. Different combinations of direct data paths and in-coverage and out-of-coverage may be considered.

Figure 5:
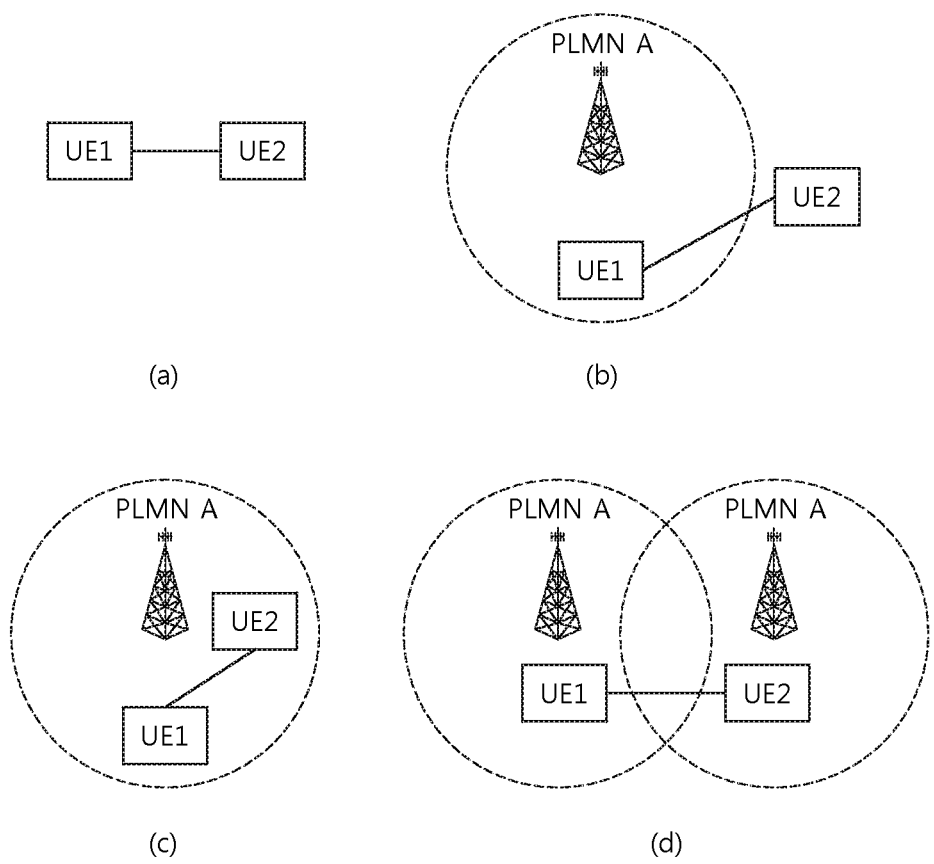
FIG. 5 and FIG. 6 show ProSe direct communication scenarios without a relay.
Figure 6:
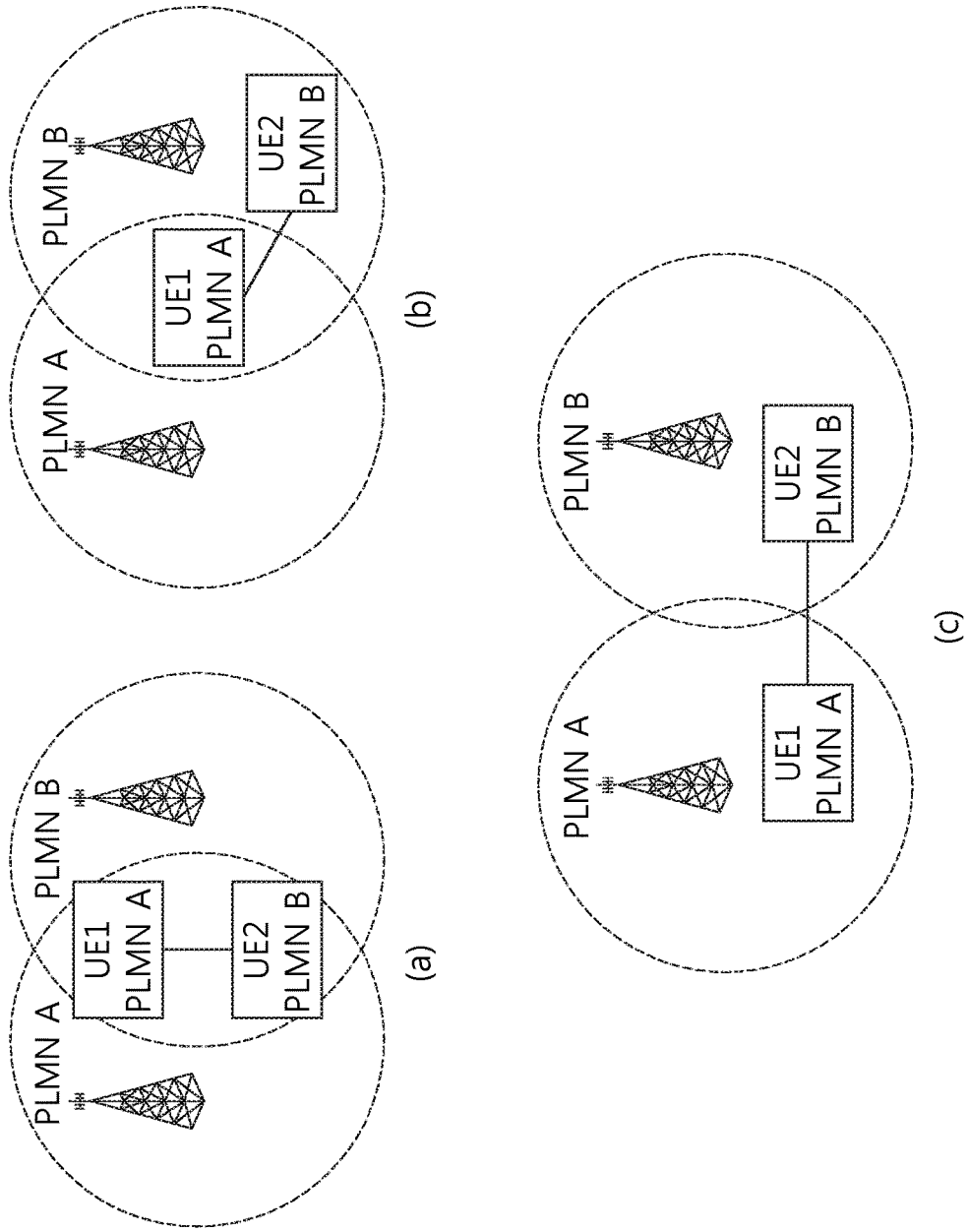

FIG. 5 and FIG. 6 show ProSe direct communication scenarios without a relay. FIG. 5-(a) shows a case that UE1 and UE2 are out of coverage. FIG. 5-(b) shows a case that UE1 is in coverage and in PLMN A, and UE2 is out of coverage. FIG. 5-(c) shows a case that UE1 and UE2 are in coverage and in PLMN A, and UE1 and UE2 shares the same PLMN A and the same cell. FIG. 5-(d) shows a case that UE1 and UE2 are in coverage and in the same PLMN A, but UE1 and UE2 are in different cells each other. FIG. 6-(a) shows a case that UE1 and UE2 are in coverage, but UE1 and UE2 are in different PLMNs (i.e., PLMN A/B) and different cells each other. UE1 and UE2 are in both cells' coverage. FIG. 6-(b) shows a case that UE1 and UE2 are in coverage, but UE1 and UE2 are in different PLMNs (i.e., PLMN A/B) and different cells each other. UE1 is in both cells' coverage and UE2 is in serving cell's coverage. FIG. 6-(c) shows a case that UE1 and UE2 are in coverage, but UE1 and UE2 are in different PLMNs (i.e., PLMN A/B) and different cells each other. UE1 and UE2 are in its own serving cell's coverage. In the description above, "in coverage and in PLMN A" means that the UE is camping on the cell of the PLMN A and under the control of the PLMN A.

Two different modes for ProSe direct communication one-to-one may be supported.

Network independent direct communication: This mode of operation for ProSe direct communication does not require any network assistance to authorize the connection and communication is performed by using only functionality and information local to the UE. This mode is applicable only to pre-authorized ProSe-enabled public safety UEs, regardless of whether the UEs are served by E-UTRAN or not.

Network authorized direct communication: This mode of operation for ProSe direct communication always requires network assistance and may also be applicable when only one UE is "served by E-UTRAN" for public safety UEs. For non-public safety UEs both UEs must be "served by E-UTRAN".

Figure 7:
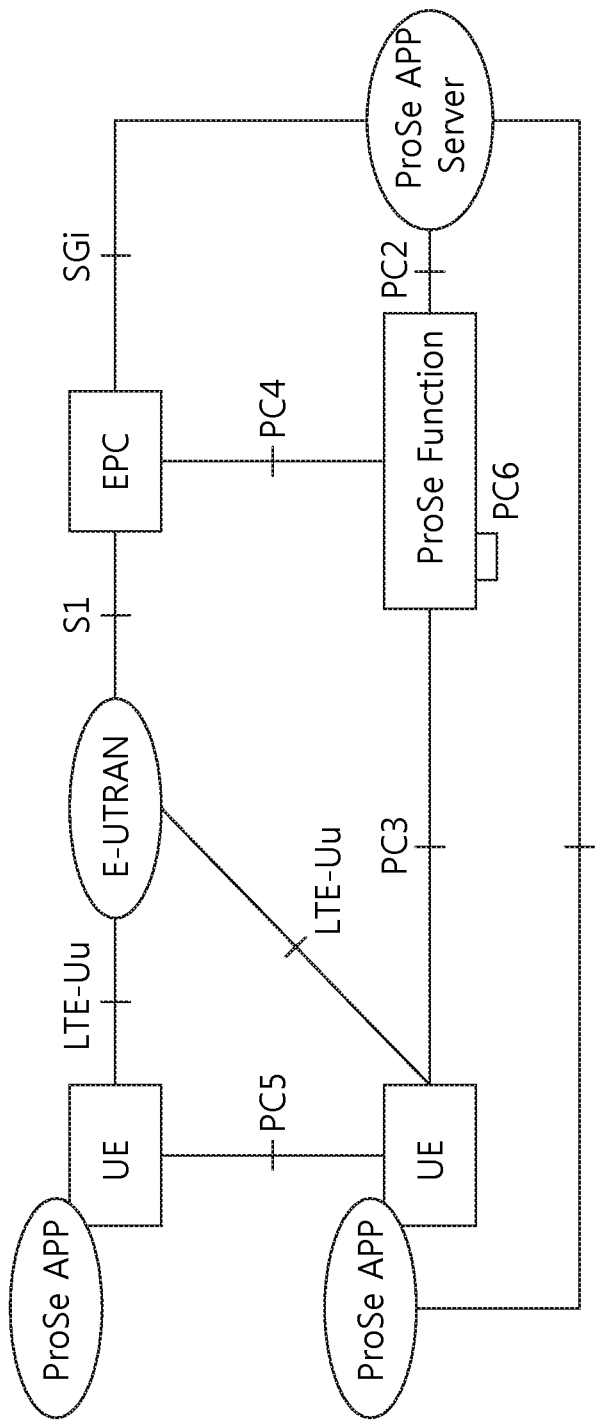
FIG. 7 shows reference architecture for ProSe.

FIG. 7 shows reference architecture for ProSe. Referring to FIG. 7, the reference architecture for ProSe includes E-UTRAN, EPC, a plurality of UEs having ProSe applications, ProSe application server, and ProSe function. The EPC represents the E-UTRAN core network architecture. The EPC may include entities such as MME, S-GW, P-GW, policy and charging rules function (PCRF), home subscriber server (HSS), etc. The ProSe application servers are users of the ProSe capability for building the application functionality. In the public safety cases, they may be specific agencies (PSAP), or in the commercial cases social media. These applications may be defined outside the 3GPP architecture but there may be reference points towards 3GPP entities. The application server can communicate towards an application in the UE. Applications in the UE use the ProSe capability for building the application functionality. Example may be for communication between members of public safety groups or for social media application that requests to find buddies in proximity.

The ProSe function in the network (as part of EPS) defined by 3GPP has a reference point towards the ProSe application server, towards the EPC and the UE. The functionality may include at least one of followings. But the functionality may not be restricted to the followings.

Interworking via a reference point towards the 3rd party applications.

Authorization and configuration of the UE for discovery and direct communication.

Enable the functionality of the EPC level ProSe discovery.

ProSe related new subscriber data and handling of data storage, and also handling of ProSe identities.

Security related functionality.

Provide control towards the EPC for policy related functionality.

Provide functionality for charging (via or outside of EPC, e.g., offline charging).

Reference points/interfaces in the reference architecture for ProSe are described.

PC1: It is the reference point between the ProSe application in the UE and in the ProSe application server. It is used to define application level signaling requirements.

PC2: It is the reference point between the ProSe application server and the ProSe function. It is used to define the interaction between ProSe application server and ProSe functionality provided by the 3GPP EPS via ProSe function. One example may be for application data updates for a ProSe database in the ProSe function. Another example may be data for use by ProSe application server in interworking between 3GPP functionality and application data, e.g., name translation.

PC3: It is the reference point between the UE and ProSe function. It is used to define the interaction between UE and ProSe function. An example may be to use for configuration for ProSe discovery and communication.

PC4: It is the reference point between the EPC and ProSe function. It is used to define the interaction between EPC and ProSe function. Possible use cases may be when setting up a one-to-one communication path between UEs or when validating ProSe services (authorization) for session management or mobility management in real time.

PC5: It is the reference point between UE to UE used for control and user plane for discovery and communication, for relay and one-to-one communication (between UEs directly and between UEs over LTE-Uu).

PC6: This reference point may be used for functions such as ProSe discovery between users subscribed to different PLMNs.

SGi: In addition to the relevant functions via SGi, it may be used for application data and application level control information exchange.

ProSe direct communication is a mode of communication whereby two public safety UEs can communicate with each other directly over the PC5 interface. This communication mode is supported when the UE is served by E-UTRAN and when the UE is outside of E-UTRA coverage.

The ProSe-enabled UE may operate in two modes for resource allocation. In mode 1, resource allocation is scheduled by the eNB. In mode 1, the UE may need to be RRC_CONNECTED in order to transmit data. The UE may request transmission resources from the eNB. The eNB may schedule transmission resources for transmission of scheduling assignment(s) and data. The UE may send a scheduling request (dedicated scheduling request (D-SR) or random access) to the eNB followed by a ProSe buffer status report (BSR). Based on the BSR, the eNB may determine that the UE has data for a ProSe direct communication transmission and estimate the resources needed for transmission. In mode, 2, a UE on its own selects resources autonomously from resource pools to transmit scheduling assignment and data. If the UE is out of coverage, the UE may only use mode 2. If the UE is in coverage, the UE may use mode 1 or mode 2 according to configuration of the eNB. When there are no exceptional conditions, the UE may change from mode 1 to mode 2 or mode 2 to mode 1 only if it is configured by the eNB. If the UE is in coverage, the UE shall use only the mode indicated by eNB configuration unless one of the exceptional cases occurs.

ProSe direct discovery is defined as the procedure used by the ProSe-enabled UE to discover other ProSe-enabled UE(s) in its proximity using E-UTRA direct radio signals via the PC5 interface. ProSe direct discovery is supported only when the UE is served by E-UTRAN.

There are two types of resource allocation for discovery information announcement. Type 1 is a resource allocation procedure where resources for announcing of discovery information are allocated on a non-UE specific basis. The eNB may provide the UE(s) with the resource pool configuration used for announcing of discovery information. The configuration may be signaled in system information block (SIB). The UE autonomously selects radio resource(s) from the indicated resource pool and announce discovery information. The UE may announce discovery information on a randomly selected discovery resource during each discovery period. Type 2 is a resource allocation procedure where resources for announcing of discovery information are allocated on a per UE specific basis. The UE in RRC_CONNECTED may request resource(s) for announcing of discovery information from the eNB via RRC. The eNB may assign resource(s) via RRC. The resources may be allocated within the resource pool that is configured in UEs for monitoring.

Figure 8:
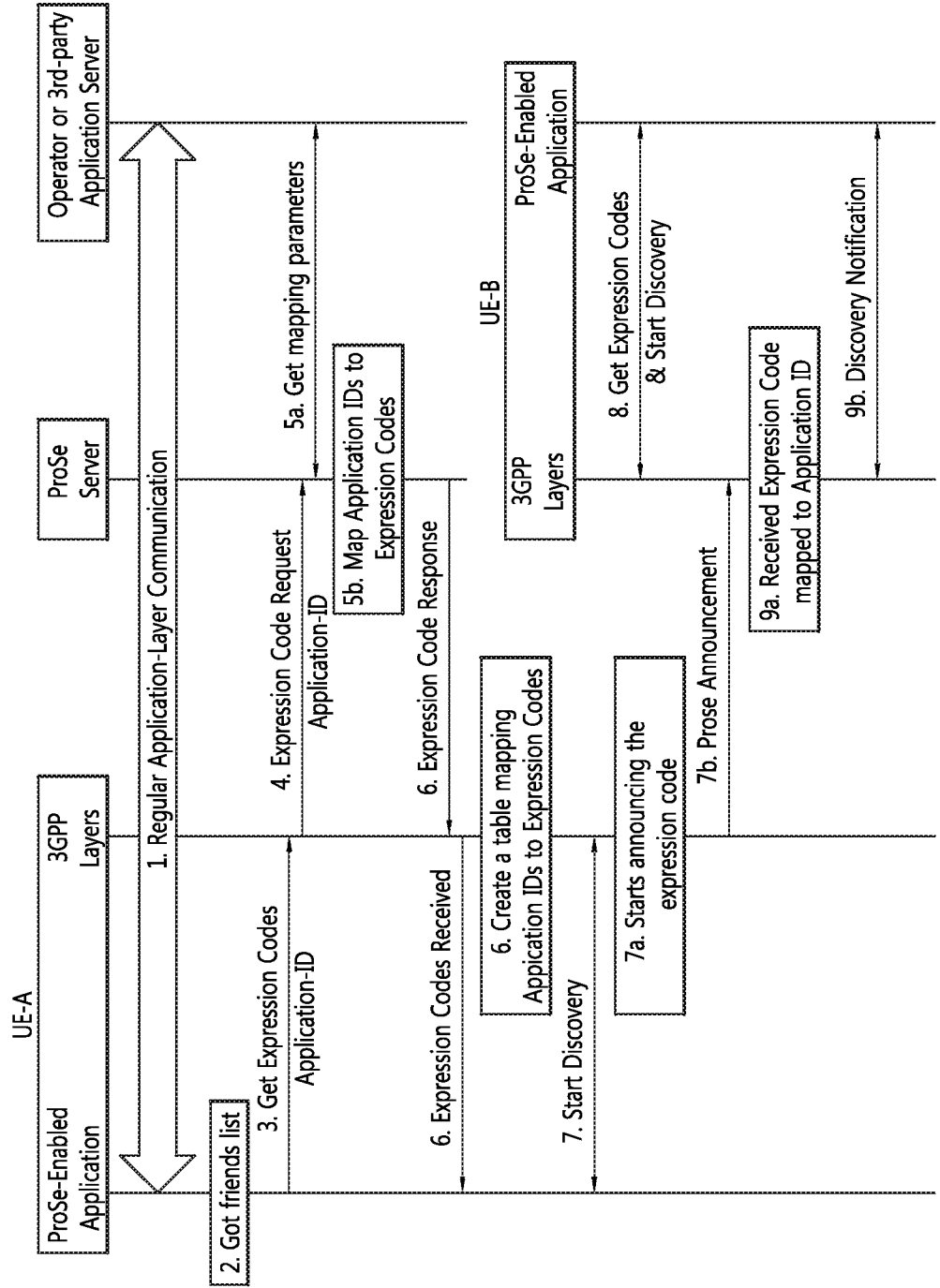
FIG. 8 shows an example of one-step ProSe direct discovery procedure.

FIG. 8 shows an example of one-step ProSe direct discovery procedure. In FIG. 8, two UEs are running the same ProSe-enabled application and it is assumed that the users of those UEs have a "friend" relationship on the considered application. The "3GPP Layers" shown in FIG. 8 correspond to the functionality specified by 3GPP that enables mobile applications in the UE to use ProSe discovery services.

UE-A and UE-B run a ProSe-enabled application, which discovers and connects with an associated application server in the network. As an example, this application could be a social networking application. The application server could be operated by the 3GPP network operator or by a third-party service provider. When operated by a third-party provider, a service agreement is required between the third-party provider and the 3GPP operator in order to enable communication between the ProSe Server in the 3GPP network and the application server.

1. Regular application-layer communication takes place between the mobile application in UE-A and the application server in the network.

2. The ProSe-enabled application in UE-A retrieves a list of application-layer identifiers, called "friends". Typically, such identifiers have the form of a network access identifier.

3. The ProSe-enabled application wants to be notified when one of UE-A's friends is in the vicinity of UE-A. For this purpose, it requests from the 3GPP layers to retrieve private expressions codes (i) for the user of UE-A (with an application-layer identity) and (ii) for each one of his friends.

4. The 3GPP layers delegate the request to a ProSe server in the 3GPP network. This server can be located either in home PLMN (HPLMN) or in a visited PLMN (VPLMN). Any ProSe server that supports the considered application can be used. The communication between the UE and ProSe server can take place either over the IP layer or below the IP layer. If the application or the UE is not authorized to use ProSe discovery, then the ProSe server rejects the request.

5. The ProSe server maps all provided application-layer identities to private expression codes. For example, the application-layer identity is mapped to the private expression code. This mapping is based on parameters retrieved from the application server in the network (e.g., mapping algorithm, keys, etc.) thus the derived private expression code can be globally unique. In other words, any ProSe server requested to derive the private expression of the application-layer identity for a specific application, it will derive the same private expression code. The mapping parameters retrieved from the application server describe how the mapping should be done. In this step, the ProSe server and/or the application server in the network authorize also the request to retrieve expression codes for a certain application and from a certain user. It is ensured, for example, that a user can retrieves expression codes only for his friends.

6. The derived expression codes for all requested identities are sent to the 3GPP layers, where they are stored for further use. In addition, the 3GPP layers notify the ProSe-enabled application that expression codes for the requested identities and application have been successfully retrieved. However, the retrieved expression codes are not sent to the ProSe-enabled application.

7. The ProSe-enabled application requests from the 3GPP layers to start discovery, i.e., attempt to discover when one of the provided "friends" is in the vicinity of UE-A and, thus, direct communication is feasible. As a response, UE-A announces the expression code of the application-layer identity for the considered application. The mapping of this expression code to the corresponding application-layer identify can only be performed by the friends of UE-A, who have also received the expression codes for the considered application.

8. UE-B also runs the same ProSe-enabled application and has executed steps 3-6 to retrieve the expression codes for friends. In addition, the 3GPP layers in UE-B carry out ProSe discovery after being requested by the ProSe-enabled application.

9. When UE-B receives the ProSe announcement from UE-A, it determines that the announced expression code is known and maps to a certain application and to the application-layer identity. The UE-B can determine the application and the application identity that corresponds to the received expression code because it has also received the expression code for the application-layer identity (UE-A is included in the friend list of UE-B).

The steps 1-6 in the above procedure can only be executed when the UE is inside the network coverage. However, these steps are not required frequently. They are only required when the UE wants to update or modify the friends that should be discovered with ProSe direct discovery. After receiving the requested expression codes from the network, the ProSe discovery (steps 7 and 9) can be conducted either inside or outside the network coverage.

It is noted that an expression code maps to a certain application and to a certain application identity. Thus when a user runs the same ProSe-enabled application on multiple UEs, each UE announces the same expression code.

Figure 9:
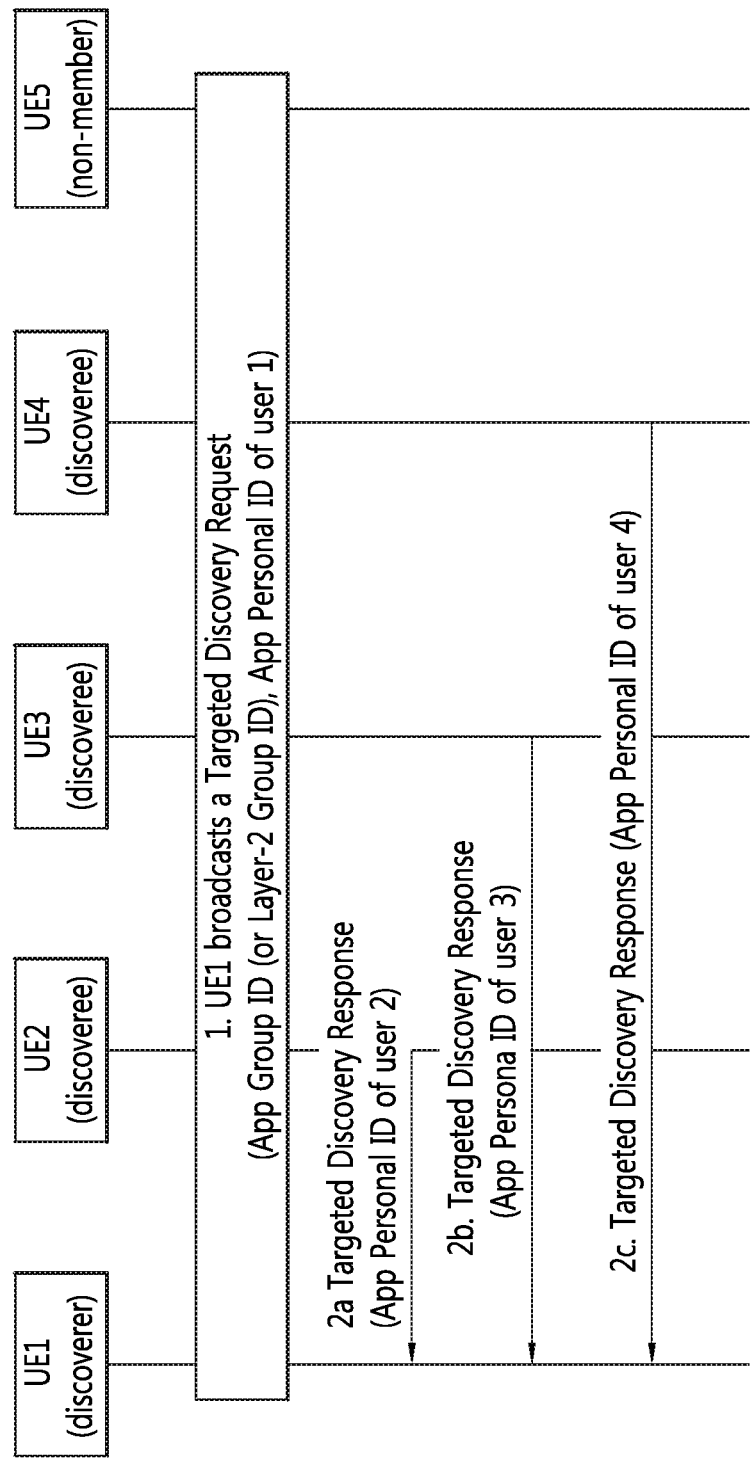
FIG. 9 shows an example of two-steps ProSe direct discovery procedure.

FIG. 9 shows an example of two-steps ProSe direct discovery procedure.

1. The user of UE1 (the discoverer) wishes to discover whether there are any members of a specific group communication service enabler (GCSE) group in proximity. UE1 broadcasts a targeted discovery request message containing the unique App group ID (or the Layer-2 group ID) of the targeted GCSE group. The targeted discovery request message may also include the discoverer's unique identifier (App personal ID of user 1). The targeted discovery request message is received by UE2, UE3, UE4 and UE5. Apart from the user of UE5, all other users are members of the requested GCSE group and their UEs are configured accordingly.

2a-2c. Each one of UE2, UE3 and UE4 responds directly to UE1 with a targeted discovery response message which may contain the unique App personal ID of its user. In contrast, UE5 sends no response message.

In three step procedure, UE1 may respond to the targeted discovery response message by sending a discovery confirm message.

RRC connection establishment is described. It may be referred to Section 5.3.3 of 3GPP 36.331 V11.1.0 (2012 September).

Figure 10:
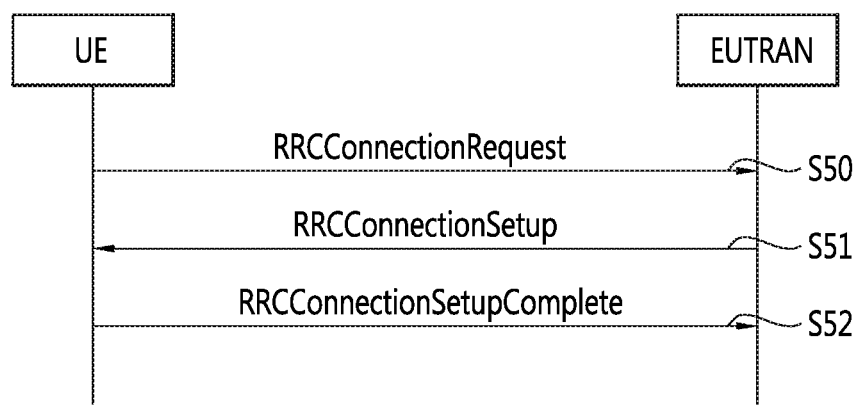
FIG. 10 shows a successful RRC connection establishment procedure.

FIG. 10 shows a successful RRC connection establishment procedure. In step S50, the UE transmits the RRCConnectionRequest message to the E-UTRAN. In step S51, the E-UTRAN transmits the RRCConnectionSetup message to the UE. In step S52, the UE transmits the RRCConnectionSetupComplete message to the E-UTRAN.

Figure 11:
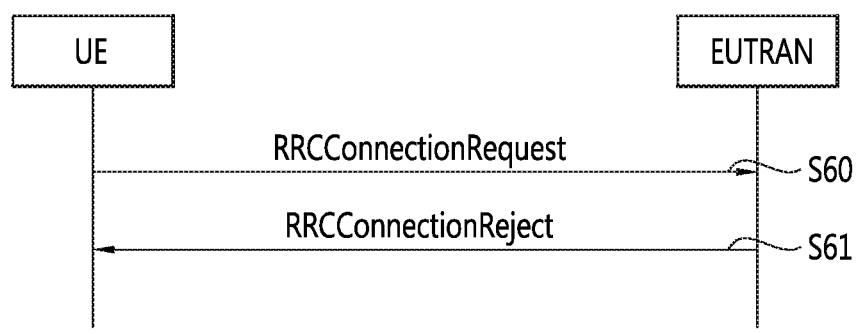
FIG. 11 shows an RRC connection establishment procedure which is rejected by a network.

FIG. 11 shows an RRC connection establishment procedure which is rejected by a network. In step S60, the UE transmits the RRCConnectionRequest message to the E-UTRAN. In step S61, the E-UTRAN transmits the RRCConnectionReject message to the UE.

The UE initiates the procedure when upper layers request establishment of an RRC connection while the UE is in RRC_IDLE. Upon initiation of the procedure, the UE shall:

1> if upper layers indicate that the RRC connection is subject to extended access barring (EAB):
2> if the result of the EAB check is that access to the cell is barred:
3> inform upper layers about the failure to establish the RRC connection and that EAB is applicable, upon which the procedure ends;
1> if the UE is establishing the RRC connection for mobile terminating calls:
2> if timer T302 is running:
3> inform upper layers about the failure to establish the RRC connection and that access barring for mobile terminating calls is applicable, upon which the procedure ends;
1> else if the UE is establishing the RRC connection for emergency calls:
2> if SystemInformationBlockType2 includes the ac-BarringInfo:
3> if the ac-BarringForEmergency is set to TRUE:
4> if the UE has one or more access classes, as stored on the universal subscriber identity module (USIM), with a value in the range 11 . . . 15, which is valid for the UE to use:
5> if the ac-BarringInfo includes ac-BarringForMO-Data, and for all of these valid access classes for the UE, the corresponding bit in the ac-BarringForSpecialAC contained in ac-BarringForMO-Data is set to one:
6> consider access to the cell as barred;
4> else:
5> consider access to the cell as barred;
2> if access to the cell is barred:
3> inform upper layers about the failure to establish the RRC connection, upon which the procedure ends;
1> else if the UE is establishing the RRC connection for mobile originating calls:
2> perform access barring check using T303 as "Tbarring" and ac-BarringForMO-Data as "AC barring parameter";
2> if access to the cell is barred:
3> if SystemInformationBlockType2 includes ac-BarringForCSFB or the UE does not support circuit switched (CS) fallback:
4> inform upper layers about the failure to establish the RRC connection and that access barring for mobile originating calls is applicable, upon which the procedure ends;
3> else (SystemInformationBlockType2 does not include ac-BarringForCSFB and the UE supports CS fallback):
4> if timer T306 is not running, start T306 with the timer value of T303;
4> inform upper layers about the failure to establish the RRC connection and that access barring for mobile originating calls and mobile originating CS fallback is applicable, upon which the procedure ends;
1> else if the UE is establishing the RRC connection for mobile originating signalling:
2> perform access barring check using T305 as "Tbarring" and ac-BarringForMO-Signalling as "AC barring parameter";
2> if access to the cell is barred:
3> inform upper layers about the failure to establish the RRC connection and that access barring for mobile originating signalling is applicable, upon which the procedure ends;
1> else (the UE is establishing the RRC connection for mobile originating CS fallback):
2> if SystemInformationBlockType2 includes ac-BarringForCSFB:
3> perform access barring check using T306 as "Tbarring" and ac-BarringForCSFB as "AC barring parameter";
3> if access to the cell is barred:
4> inform upper layers about the failure to establish the RRC connection and that access barring for mobile originating CS fallback is applicable, due to ac-BarringForCSFB, upon which the procedure ends;
2> else:
3> perform access barring check using T306 as "Tbarring" and ac-BarringForMO-Data as "AC barring parameter";
3> if access to the cell is barred:
4> if timer T303 is not running, start T303 with the timer value of T306;
4> inform upper layers about the failure to establish the RRC connection and that access barring for mobile originating CS fallback and mobile originating calls is applicable, due to ac-BarringForMO-Data, upon which the procedure ends;
1> apply the default physical channel configuration;
1> apply the default semi-persistent scheduling configuration;
1> apply the default MAC main configuration;
1> apply the CCCH configuration;
1> apply the timeAlignmentTimerCommon included in SystemInformationBlockType2;
1> start timer T300;
1> initiate transmission of the RRCConnectionRequest message;

The RRCConnectionRequest message is used to request the establishment of an RRC connection. Table 1 shows an example of the RRCConnectionRequest message.

TABLE 1

```
-- ASN1START
RRCConnectionRequest ::=        SEQUENCE {
    criticalExtensions              CHOICE {
        rrcConnectionRequest-r8         RRCConnectionRequest-r8-IEs,
        criticalExtensionsFuture        SEQUENCE { }
    }
}
RRCConnectionRequest-r8-IEs ::= SEQUENCE {
    ue-Identity                     InitialUE-Identity,
    establishmentCause ,
    spare                           BIT STRING (SIZE (1))
}
InitialUE-Identity ::=      CHOICE {
    s-TMSI ,
    randomValue                 BIT STRING (SIZE (40))
}
EstablishmentCause ::=  ENUMERATED {
                            emergency, highPriorityAccess, mt-Access, mo-Signalling,
                            mo-Data, delayTolerantAccess-v1020, spare2, spare1}
-- ASN1STOP
```

Referring to Table 1, the establishmentCause field provides the establishment cause for the RRC connection request as provided by the upper layers. With regard to the cause value names, highPriorityAccess concerns AC11 to AC15, 'mt' stands for 'mobile terminating' and 'mo' for 'mobile originating. The random Value field indicates an integer value in the range 0 to $2^{40}-1$. The ue-Identity field indicates UE identity included to facilitate contention resolution by lower layers.

The UE may encounter a cell that does not provide radio resources for a D2D operation (hereinafter, D2D resources) or provides too restrictive D2D resources. In this case, the UE may have difficulties to continue on-going D2D operation/session or may have difficulties in initiating new D2D operation/session. Meanwhile, the network may need to know a specific frequency on which a D2D operation are performed. For example, only a specific frequency may provide D2D resources, and in this case the UE may prefer to stay on that frequency to enable/continue a D2D operation. The network should not move the UE to other frequency that does not support a D2D operation on that frequency. Accordingly, various information for a D2D operation may need to be informed to the network.

Hereinafter, a method for transmitting an indication for a D2D operation according to an embodiment of the present invention is described. According to an embodiment of the present invention, the UE may notify to network the various information for a D2D operation, in order to encourage the network to provide proper (e.g. more) D2D resources and other RRC configurations towards the UE and/or other UEs, and the UE may transmit the following information.

Whether the UE prefers to perform a D2D operation on a specific frequency (primary frequency): This information indicates that the UE prefers to stay on the specific frequency for a D2D operation.

Whether the UE is public safety UE: This information indicates that the UE is important and thus needs to be treated with higher priority than other UEs.

Whether the UE is performing public safety communication: This information indicates that the UE is important and thus needs to be treated with higher priority than other UEs.

Whether a call is for public safety communication: This information indicates that the call is important and thus needs to be treated with higher priority than other normal calls during access control. For example, the network may accept RRC connection establishment attempt for the public safety call while rejecting other normal calls in overloaded situation. This may be indicated via new code point of the establishment cause.

A list of frequencies on which the UE prefers for a D2D operation: This information indicates that the UE supports a D2D operation on those frequencies, and does not support on other frequencies.

Whether the UE supports a D2D operation: This information may be indicated per UE capability. If the UE supports a D2D operation in any frequency that network provides (e.g., in reselection information), then the UE considers that it supports a D2D operation. Alternatively, this information may be indicated per frequency capability.

Whether the UE is interested in a D2D operation: This information indicates the network that the UE may initiate a D2D operation so that it is encouraged that the network needs to let the UE move to or stay on a specific frequency (cell) on which the UE can perform a D2D operation or so that it is encouraged that the network needs to provide proper D2D configuration to the UE. The network may perform polling to UEs via broadcast or dedicated signaling to know how many UEs or which UEs in the cells are interested in a D2D operation.

The kind of a D2D operation: This information may indicate that a D2D operation is either D2D communication or D2D direct discovery. Alternatively, this information may indicate that a D2D operation is either D2D transmission or D2D reception. The optimal configuration to be provided to the UE may be different depending on whether the UE is interested in only D2D transmission or only D2D reception or both.

By jointly combining whether the UE is interested in a D2D operation and the kinds of a D2D operation described above, the UE may indicate at least one of the followings: 1) the UE is interested to receive data of D2D communication, 2) the UE is interested to transmit data of D2D communication, 3) the UE is interested to receive signals/messages of D2D discovery, 4) the UE is interested to transmit signals/messages of D2D discovery. The indication of interest in D2D transmission may be equivalent to request the network to provide D2D configuration and D2D resources applicable for D2D transmission.

Indication that the UE is no longer interested in a D2D operation. It may indicate that the UE is no longer interested in D2D communication. It may indicate that the UE is no longer interested in D2D discovery. It may further indicate that at least one frequency for which the UE is no longer interested in the concerned D2D operation.

Whether the UE enters network coverage (from out-of-coverage): This information indicates that the UE is now under the coverage of the cell. This information may be signalled via AS signaling (e.g., RRC signaling or physical layer signaling). Alternatively, this information may be signaled via NAS signaling by using a tracking area update procedure if the UE is registered or attach procedure if the UE is not registered.

The D2D resources before entering (or detecting) the cell coverage: This information may indicate timing and/or frequency information (period or pattern) for which the UE was allowed for a D2D operation. This information may also indicate timing and/or frequency information (period or pattern) for which the group of the UE was allowed for a D2D operation.

Whether the UE provides a synchronization signal used by a group of the UE for a D2D operation within the group.

The timing difference between eNB synchronization signal and the UE synchronization signal: This information may be expressed in terms of subframe offset, time slot offset, and/or frequency offset.

The information element described above may be separate information for D2D transmission operation and for D2D reception operation. Or, the information element described above may be common information for D2D transmission operation and for D2D reception operation. Specific information element among information described above may be transmitted only for D2D transmission operation. All or part of information elements described above or a specific combination of information elements described above may be transmitted to the network depending on embodiments.

The information described above may be transmitted to the eNB by RRC signaling. Further, the information described above may be transmitted to the MME by NAS signaling.

The information described above may be transmitted to the network upon a request by the network. The information described above may be transmitted to the network, e.g., eNB, that can interpret the information or that can support the corresponding D2D operation. The network may indicate the UE whether the network supports interpretation of the information or whether the network supports the corresponding D2D operation via broadcast signaling, e.g., SIB1 or SIB2. The information described above may be transmitted to the network during a connection establishment procedure, if only information elements to be transmitted has a small size. For example, the information may be transmitted to the network via a new cause value of an RRC connection request message during the RRC connection establishment procedure. Or, the information may be transmitted to the network via an RRC connection setup complete message during the RRC connection establishment procedure. Alternatively, the information described above may be transmitted to the network during or after mobility in RRC_CONNECTED. That is, the information described above may be transmitted to the network via an RRC message after the RRC connection establishment procedure is completed. Alternatively, the information described above may be transmitted included in a measurement report that may trigger mobility procedure.

If the information is updated, i.e., the information has changed, the UE may trigger reporting of the information. When the network receives from the UE the information described above, the network may forward the received information upon mobility to a new cell for the UE.

Among the information elements described above, a frequency indication for a D2D operation is described in detail. As described above, the UE may transmit an indication about a frequency on which a D2D operation is performed. The UE may transmit information on a list of frequencies on which the UE is interested in a D2D operation. When the UE indicates multiple frequencies in the list of frequencies, the order of the indicated multiple frequencies may indicate the preferred order for the D2D operation. That is, whether the UE prefers to perform a D2D operation on a specific frequency or a list of frequencies on which the UE prefers for a D2D operation may be transmitted to the network. Accordingly, the UE, which intends to perform a D2D operation or is performing a D2D operation, may transmit information about frequencies for a D2D operation to the network.

If the UE is interested in a D2D operation on primary serving frequency (i.e., the UE is interested in a D2D operation on the current frequency), the UE may omit transmission of the frequency indication when transmitting the indication of interest in a D2D operation to the network. Alternatively, If the UE is interested in a D2D operation on inter-frequency, the UE may simply include {InterFrequency} in the indication of interest in a D2D operation in order to indicate that the D2D operation is to be performed on inter-frequency. Alternatively, if the UE is interested in a D2D operation on secondary carrier frequency or inter-frequency, the UE may simply include either of {SecondaryCarrier, InterFrequency} in the indication of interest in a D2D operation in order to indicate that the D2D operation is to be performed on non-primary frequency.

Upon receiving the frequency indication or information on a list of frequencies on which the UE is interested in a D2D operation, the network may configure the UE with a measurement configuration to measure the indicated frequency, if necessary, to detect a cell as a target of handover. If capability of the UE does not support a D2D operation on the indicated frequency and cellular operation on the current frequency simultaneously while the UE is connected to a cell on the current frequency, the network may handover the UE to a cell of the indicated frequency to ensure the continuity of the D2D operation on that frequency. If capability of the UE does not support a D2D operation on the indicated frequency and cellular operation on the current frequency simultaneously while the UE is connected to a cell on the current frequency, the network may handover the UE to a cell of other frequency, if the UE supports a D2D operation on the indicated frequency while the UE is connected to a cell on the frequency to which the UE is handed over. If the network knows the D2D resources applicable for a D2D operation on the indicated frequency, the network may provide the applicable D2D resources via dedicated signaling. The dedicated D2D resources may eliminate the necessity for the UE to acquire the D2D resources from the indicated frequency via SIB, which will be helpful to minimize the discontinuity of a D2D operation. Upon receiving the indication that the UE is interested in inter-frequency D2D discovery, the network may configure the UE with a long discontinuous reception (DRX), if necessary to provide sufficient time duration for which the UE can perform monitoring of D2D discovery on inter-frequency.

Figure 12:
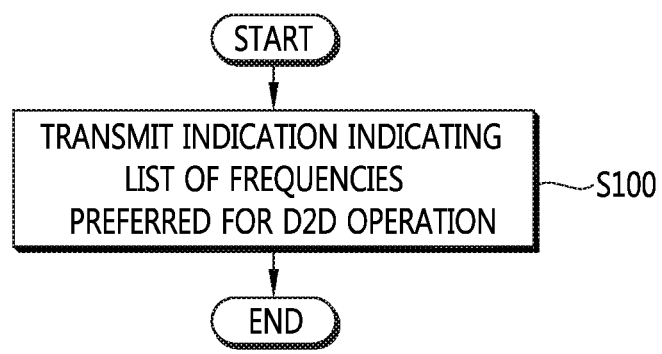
FIG. 12 shows an example of a method for transmitting an indication according to an embodiment of the present invention.

FIG. 12 shows an example of a method for transmitting an indication according to an embodiment of the present invention. In step S100, the UE transmits an indication indicating a list of frequencies preferred for a D2D operation. That is, the UE may provide resource information that has been considered to be allowed for a D2D operation such that the network may properly configure D2D resources within the cell coverage for the UE.

The indication may indicate a list of frequencies preferred for D2D discovery signal reception and/or D2D discovery signal transmission. Alternatively, the indication may indicate a list of frequencies preferred for D2D communication data reception and/D2D communication data transmission.

The indication may be transmitted via an RRC message after an RRC connection establishment procedure is completed. Alternatively, the indication may be transmitted during an RRC connection establishment procedure. For example, the indication may be transmitted via an RRC connection request message or an RRC connection setup complete message during the RRC connection establishment procedure. Alternatively, the indication may be transmitted upon a request by the network, assuming that the UE indicates to the network its previously on-going or D2D operation.

Figure 13:
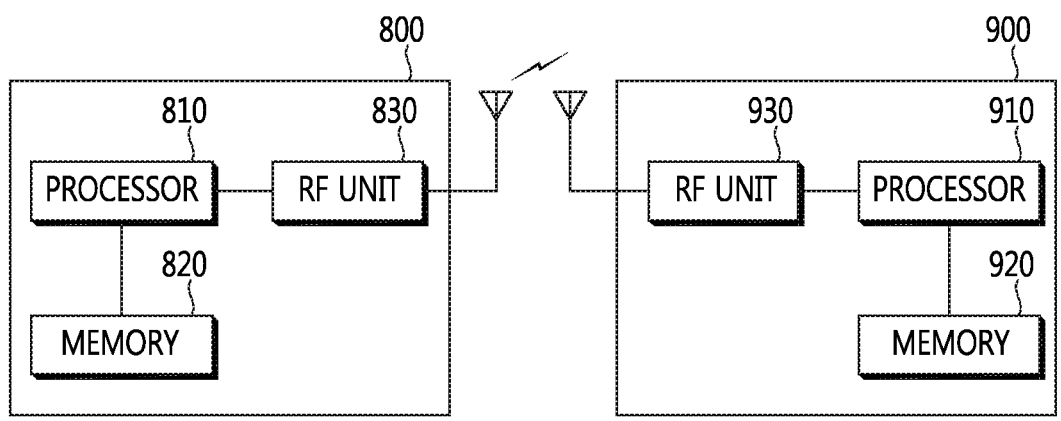
FIG. 13 is a block diagram showing wireless communication system to implement an embodiment of the present invention.

FIG. 13 is a block diagram showing wireless communication system to implement an embodiment of the present invention.

An entity of the network 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a wireless device in a wireless communication system, the method comprising:
   transmitting, by the wireless device to a network, a first message for a device-device (D2D) operation, wherein the first message includes first information on at least one frequency on which the wireless device prefers for a D2D reception and second information on at least one frequency on which the wireless device prefers for a D2D transmission;
   transmitting, by the wireless device to the network, a second message for the D2D operation based on an update of at least one of the first information and/or the second information;
   receiving, by the wireless device from the network, D2D radio resources; and
   performing, by the wireless device, the D2D operation including at least one of the D2D reception and/or the D2D transmission based on the D2D radio resources.

2. The method of claim 1, wherein the D2D operation is performed on a frequency indicated by the first information and/or the second information.

3. The method of claim 2, further comprising:
   receiving, by the wireless device from the network, a measurement configuration to perform measurement on the frequency to detect a cell; and
   performing, by the wireless device, the measurement on the frequency based on the measurement configuration.

4. The method of claim 3, wherein the wireless device is handed over to the cell on the frequency.

5. The method of claim 1, wherein the wireless device is in communication with at least one of a mobile device, a network, and/or autonomous vehicles other than the wireless device.

6. A wireless device in a wireless communication system, the wireless device comprising:
   a memory;
   a transceiver configured to transmit or receive a radio signal; and
   a processor, operably coupled to the memory and the transceiver,
   wherein the wireless device is configured to:
   transmit, via the transceiver to a network, a first message for a device-device (D2D) operation, wherein the first message includes first information on at least one frequency on which the wireless device prefers for a D2D reception and second information on at least one frequency on which the wireless device prefers for a D2D transmission;

transmit, via the transceiver to the network, a second message for the D2D operation based on an update of at least one of the first information and/or the second information;

receive, via the transceiver from the network, D2D radio resources; and perform, via the transceiver, the D2D operation including at least one of the D2D reception and/or the D2D transmission based on the D2D radio resources.

7. The wireless device of claim 6, wherein the D2D operation is performed on a frequency indicated by the first information and/or the second information.

8. The wireless device of claim 7, wherein the wireless device is further configured to:

receive, via the transceiver from the network, a measurement configuration to perform measurement on the frequency to detect a cell; and perform the measurement on the frequency based on the measurement configuration.

9. The wireless device of claim 8, wherein the wireless device is handed over to the cell on the frequency.

10. A processor for a wireless device in a wireless communication system, wherein the processor is configured to:

control the wireless device to transmit, to a network, a first message for a device-device (D2D) operation, wherein the first message includes first information on at least one frequency on which the wireless device prefers for a D2D reception and second information on at least one frequency on which the wireless device prefers for a D2D transmission;

control the wireless device to transmit, to the network a second message for the D2D operation based on an update of at least one of the first information and/or the second information;

control the wireless device to receive, from the network, D2D radio resources; and control the wireless device to perform the D2D operation including at least one of the D2D reception and/or the D2D transmission based on the D2D radio resources.

* * * * *